Jan. 6, 1931.     F. W. MEYER     1,788,118
COVER FOR MANHOLES, ETC
Filed June 12, 1929
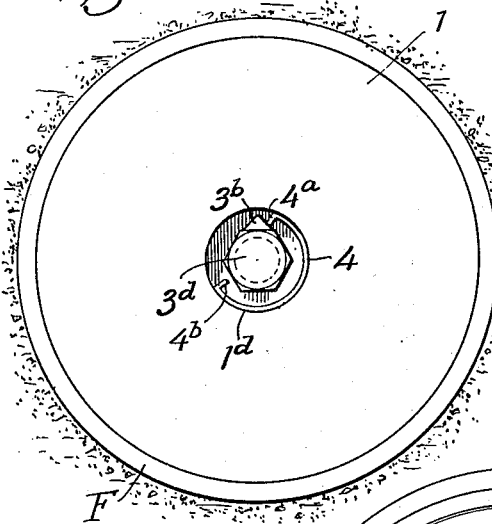
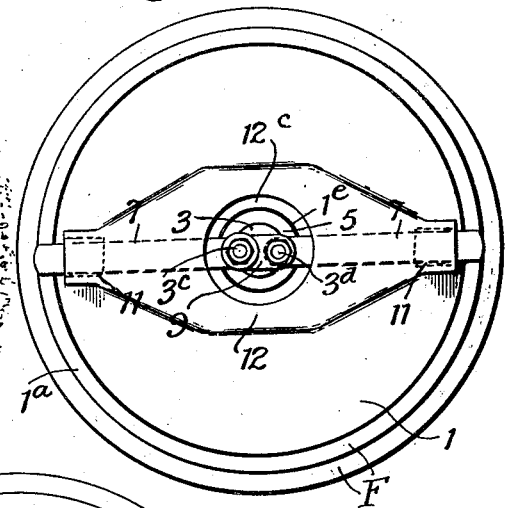
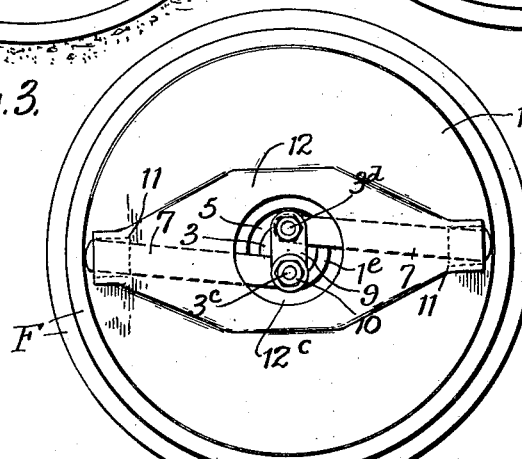
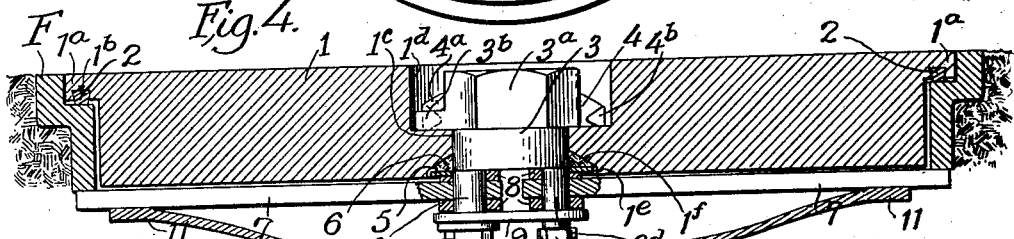
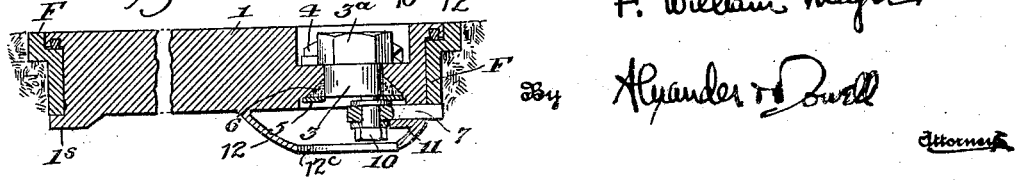
Inventor
F. William Meyer
By Alexander & Dowell
Attorney Patented Jan. 6, 1931

1,788,118

UNITED STATES PATENT OFFICE

FRED WILLIAM MEYER, OF BUECHEL, KENTUCKY

COVER FOR MANHOLES, ETC.

Application filed June 12, 1929. Serial No. 370,320.

This invention is a novel improvement in removable covers for manholes, service boxes, sewers, and the like, and the principal object thereof is to provide a cover having novel sliding bolt means for locking same to the frame of the manhole, service box, sewer or the like, the sliding bolts being simultaneously projected or retracted by eccentrics on a rotatable bolt extending through the cover, with means around the bolt for preventing water from passing around the bolt through the cover.

Other minor objects of the invention will be hereinafter set forth.

I will explain the invention with reference to the accompanying drawing which illustrates one practical embodiment thereof to enable others to adopt and use the same; and will summarize in the claims the novel features of construction, and novel combinations of parts, for which protection is desired.

In said drawings;

Fig. 1 is a top plan view of the cover seated in its frame.

Fig. 2 is a bottom plan view of the cover detached showing the sliding bolts projected.

Fig. 3 is a view similar to Fig. 2 but showing the sliding bolts in retracted position.

Fig. 4 is an enlarged section through the cover showing same locked in a conventional manhole frame.

Fig. 5 is a view of a modification for use with large manhole frames.

As shown in the drawing, the cover 1 is preferably circular in plan although it may be of any desired shape, the same being provided with a peripheral flange $1a$ at its upper end, and on the under side of said flange is a countersunk annular groove $1b$ adapted to receive a lead or other gasket 2 to make the cover water-tight when in place in the manhole frame member F.

Extending through the cover 1 is a bore $1c$ adapted to receive the shank of a bolt 3, and at the upper end of bore $1c$ is a circular recess $1d$ adapted to receive the head $3a$ of said bolt, the recess $1d$ being of larger diameter than that of the bolt head. A projection $3b$ formed on the side of head $3a$ is adapted to engage the opposite flanged ends $4a$, $4b$, respectively of a limiting clip 4 of arcuate shape secured to the side wall of the circular recess $1d$ to limit the rotatorial movement of bolt 3.

The shank of bolt 3 terminates within the cover 1, just short of a second annular recess $1e$ at the lower end of bore $1c$, which recess $1e$ is adapted to receive a washer 5 which compresses a packing 6 in a countersunk recess $1f$ around bolt 3 to act as a stuffing box for the purpose of making a watertight connection for the said bolt. Washer 5 is centered upon two offset studs $3c$ and $3d$ projecting from the lower end of bolt 3 and extending below the lower face of cover 1, said studs $3c$, $3d$, being diametrically opposed and equidistant from the axis of the bolt.

Pivoted on the studs $3c$, $3d$, are sliding bars 7 respectively adapted to be actuated in opposite directions as the bolt 3 is rotated, the lengths of bars 7 being such that when projection $3b$ on the bolt head $3a$ is rotated adjacent one stop $4a$ (or $4b$) with the bars 7 disposed substantially parallel side by side, i. e. in retracted position, the ends of bars 7 will lie within the diameter of the body portion of cover 1; but when the bolt 3 is rotated to bring the projection $3b$ adjacent the opposite stop $4b$ (or $4a$) with the bars 7 disposed in substantial diametrical alignment, i. e. in projected position, the ends of bars 7 will be projected beyond the body portion of the cover 1 to engage the frame F of the manhole or the like.

Preferably washers 8 on studs $3c$, $3d$ are disposed above and below the bars 7 and a strip 9 having two perforations respectively receiving the studs $3c$, $3d$, may be placed over the lower washers 8, the strip 9 being held in place by nuts 10 threaded upon the studs $3c$ and $3d$. The outer end of one stud $3d$ could be cut off beyond the strip 9 in event the studs should be so close together that only one nut 10 could not be placed on the studs without interference, and ordinarily one nut 10 for the strip 9 would be sufficient. Where, however, the studs $3c$ and $3d$ are disposed sufficiently far apart, the strip 9 might even be omitted, and a nut 10 used upon each stud $3c$, $3d$.

A guard cover 12 is provided upon the bottom of cover 1 the cover being preferably formed integrally therewith to protect the studs 3c, 3d and the bars 7 from injury and breakage when the cover is resting upon the ground, said guard 12 having at its central portion a hole 12c for the purpose of providing access to the nuts 10 and the parts around the locking bolt 3 for adjustment. At the outer ends of guard plate 12 are provided guides 11 for the outer ends of sliding bars 7.

By tightening the nuts 10 all the members mounted upon the studs 3c, 3d, will be compressed, and the cover 1 will be compressed between the head 3a and washer 5; also the packing 6 will be compressed around the bolt.

If desired for use upon covers of relatively large diameter one of the studs 3c or 3d with its related sliding bar 7 could be omitted as shown in Fig. 5, in which case the bolt 3 would preferably be disposed adjacent the periphery of the cover; and a fixed locking lug 1s could be formed or cast on the cover diametrically opposite the sliding bar. The bolt 3 and sliding bar 7 would operate substantially as described with respect to Fig. 4; but only one bar 7 would be necessary, due to the use of the fixed lug 1s.

I do not limit my invention to the exact form shown in the drawing for obviously changes could be made thereon within the scope of the claims.

I claim:—

1. A cover having a bore; a bolt rotatably mounted in said bore; the lower end of the bore being countersunk; a waterproofing packing around the bolt in said countersunk bore; a washer for compressing the said packing; the shank of said bolt terminating adjacent said washer; offset studs on the end of said bolt; bars slidably mounted on the inner face of the cover, the inner ends of said bars respectively engaging said studs whereby as the bolt is rotated the bars will be projected or retracted simultaneously beyond or within the periphery of the cover.

2. In combination with a cover as set forth in claim 1 a perforated plate passed over the outer ends of said studs; and a nut on the end of one stud whereby as the nut is tightened the plate will compress the bars against the washer and the washer will compress the packing around the bolt.

3. In combination with a cover as set forth in claim 1, a guard plate on the inner face of the cover having an offset portion overlying the inner end of the bolt.

4. A cover having a bore provided with an enlarged recess in one face; a rotatable bolt in said bore having its head disposed in the recess; a projecting lug on the side of the bolt head; a member secured in the recess and having its ends disposed in the path of the lug for limiting rotation of the bolt; locking bars slidably mounted on the other face of the cover, and means on the bolt for projecting or retracting the bars beyond or within the periphery of the cover.

5. A cover having a bore provided with an enlarged recess in its outer face, a rotatable bolt in said bore having its head disposed in the recess; a projecting lug on the side of the bolt head; an arcuate plate secured to the wall of said recess and having its ends flanged into the path of said lug for limiting rotation of the bolt; locking bars slidably mounted on the inner face of the cover, and means on the bolt for projecting or retracting the bars beyond or within the periphery of the cover.

6. A cover having a bore provided with an enlarged recess at one end, a rotatable bolt in said bore; waterproofing packing in the recess around the bolt; a washer around the bolt for compressing the packing; cover locking members engaging the bolt and overlying the washer; and a nut on the bolt for maintaining the locking members in engagement therewith and for compressing the washer against the packing.

7. In combination with a cover as set forth in claim 6, a guard plate on the face of the cover having an offset portion overlying the nut.

FRED WILLIAM MEYER.